United States Patent [19]

Aridome et al.

[11] Patent Number: 5,171,944
[45] Date of Patent: Dec. 15, 1992

[54] PRESSURE PULSATION ABSORBING DEVICE

[75] Inventors: Yoshiyuki Aridome; Masanobu Nakane; Kazuyoshi Yamamoto, all of Kanagawa, Japan

[73] Assignee: Ebara Corporation, Tokyo, Japan

[21] Appl. No.: 645,738

[22] Filed: Jan. 25, 1991

[30] Foreign Application Priority Data

Jan. 26, 1990 [JP] Japan .................... 2-5631[U]

[51] Int. Cl.$^5$ ............................................. F16K 47/02
[52] U.S. Cl. ..................... 181/233; 181/234; 181/248
[58] Field of Search ............ 181/233, 234, 237, 240, 181/247, 248, 253, 254

[56] References Cited

U.S. PATENT DOCUMENTS 2,495,693  1/1950  Byrd, Jr. et al. .................. 181/233
4,768,616  9/1988  Richard et al. .................... 181/233

FOREIGN PATENT DOCUMENTS 0373155  6/1990  European Pat. Off. .
3301332  7/1984  Fed. Rep. of Germany .
719578   2/1932  France .

OTHER PUBLICATIONS

"Vibration Attenuating Method of Hydraulic System by Accumulator," Japan Mechanical Association, vol. 35-270 (Feb. 1969), pp. 369-378.
"Analysis of Water Hammer Action in Pipe System Including Air," Japan Mechanical Association, vol. 35-272 (Apr. 1969), pp. 774-781.

Primary Examiner—Michael L. Gellner
Assistant Examiner—Khanh Dang
Attorney, Agent, or Firm—Wenderoth, Lind & Ponack

[57] ABSTRACT

A pressure pulsation absorbing device adapted to be connected between a pair of piping flanges includes a cup-shaped silencer box having a central inner bore for fluid flow therethrough, and a plurality of water stop bosses integrally formed with the silencer box around the inner bore and through which piping bolts are to be inserted. An elastic cylindrical body is provided in the silencer box around the water stop bosses to thereby divide the inside space of the silencer box into a radially inward fluid flow section and a radially outward dry section. A plurality of threaded bosses are integrally formed with the silencer box in the dry section for receiving bolts for fixing a side plate covering a side opening in the dry section. A slight clearance is provided respectively between outer surfaces of the water stop bosses and an inner circumference of the cylindrical body, and between outer surfaces of the threaded bosses and an outer periphery of the cylindrical body. The pressure pulsation is absorbed by expansion and contraction of the elastic cylindrical body. However, such expansion and contraction is limited within the range of the slight clearances and, therefore, breakage of the elastic cylindrical body is prevented.

14 Claims, 2 Drawing Sheets

PRESSURE PULSATION ABSORBING DEVICE

BACKGROUND OF THE INVENTION

1. Field of the Invention

The present invention relates to a pressure pulsation absorbing device, or so-called pipe silencer, which absorbs pressure pulsation energy of a fluid to reduce or eliminate noises due to solid-borne sound caused by the vibration of a piping system.

2. Prior Art

Such a pipe silencer is based on a principle in accordance with which the piping includes a segment having an enlarged diameter, where the pressure pulsation energy is diffused and absorbed to alter the oscillation cycle. An example of such a pipe silencer is disclosed in Japanese Utility Model Publication No. 60090/1981, for example. Specifically, it comprises a piping, part of which is formed by a spherical flexible joint made of rubber, and it achieves a sufficient advantage with respect to function.

Such a joint, however, has a disadvantage in that its strength changes greatly depending on the temperature of the fluid flowing therethrough. For example, at temperatures not lower than 40° C., the strength reduced to about $\frac{1}{4}$-1/5 of that under normal temperature; hence it is not reliable and, in addition, said joint has a size which is one and a half or two or more times as large as the nominal diameter of the pipe silencer. Therefore, it has large outer dimensions and is very heavy. Further, since it has a structure in which flange bolts are implanted for interconnecting piping flanges, the interconnecting operation using the flange bolts is combersome and, in addition, it must be rigid from the viewpoint of piping support, which means that it is troublesome to install the piping.

SUMMARY OF THE INVENTION

Therefore, an object of the present invention is to provide a reliable pressure pulsation absorbing device of good having an improved strength and which is comparatively compact and light-weight.

In order to accomplish the above object, a pressure pulsation absorbing device according to the present invention is adapted to be connected between a pair of piping flanges and comprises: a cup-shaped silencer box having a central inner bore for fluid flow therethrough, and a plurality of water stop bosses integrally formed with said silencer box around said inner bore and circumferentially spaced from each other and through which piping bolts to be connected to the piping flanges are to be inserted; an elastic cylindrical body provided in said silencer box around said water stop bosses to thereby divide the inside space of said silencer box into a radially inward fluid flow section and a radially outward dry section; a side plate covering an opening of said silencer box in said dry section; and a plurality of threaded bosses integrally formed with said silencer box in said dry section and circumferentially spaced from each other and receiving bolts for fixing said side plate; wherein a slight clearance is provided between outer surfaces of said water stop bosses and an inner circumference of said cylindrical body and another slight clearance is provided between outer surfaces of said threaded bosses and an outer periphery of said cylindrical body.

Said silencer box is preferably made of cast iron or steel.

The cylindrical body is preferably formed by a rubber tube having an axial length allowing for a compression margin for sealing, upon its assembly in the silencer box.

In the pressure pulsation absorbing device described above, the outer perimeter of the cylindrical body may be restrained by the outer surface of the threaded bosses even if the cylindrical body is expanded and deformed by the fluid pressure. Therefore, the outer perimeter portions of the cylindrical body which are not opposite to the bosses will be prevented from unlimitedly expanding, being deformed and broken. Meanwhile, even if the cylindrical body is contracted due to a negative pressure of the fluid, the inner circumference is restrained by the outer surfaces of the water stop bosses. Therefore, the inner circumference portions of the cylindrical body which are not opposite to the projections will be prevented from unlimitedly contracting, buckling and being broken. In this manner, the pressure pulsation energy of the fluid may be diffused and absorbed by the relatively small deformation of the expanding and contracting of the cylindrical body.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENTS

An embodiment of the present invention will now be described with reference to the drawings.

Figure 1:
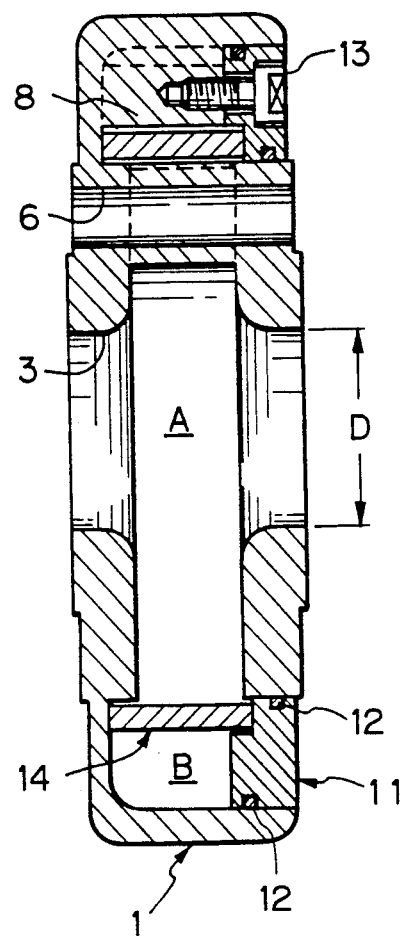
FIG. 1 is a sectional side view of an embodiment of a pressure pulsation absorbing device according to the present invention.
Figure 2:
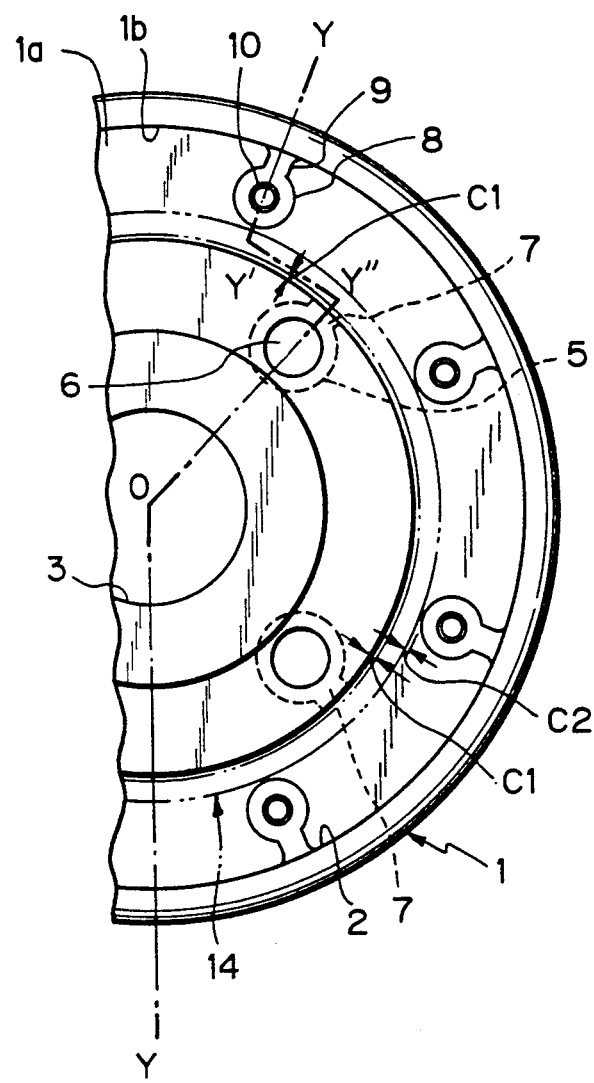
FIG. 2 is a partial front view of a silencer box used in the embodiment shown in FIG. 1.
Figure 3:
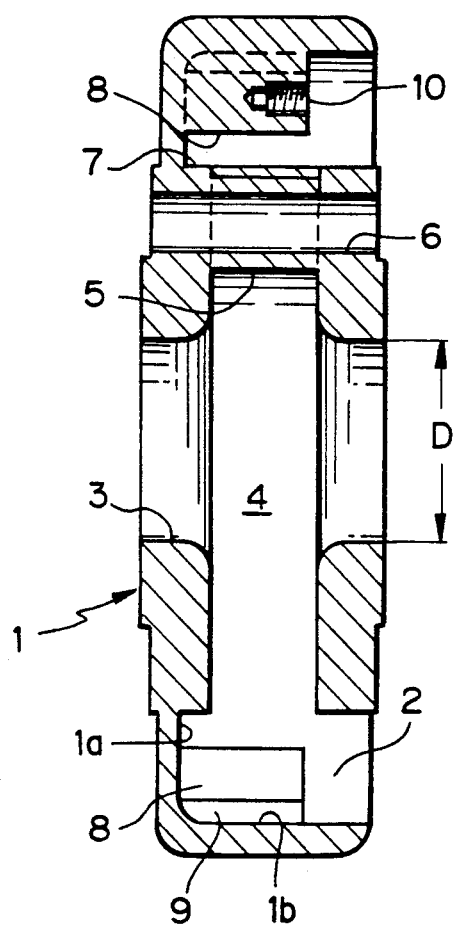
FIG. 3 is a sectional view taken along lines Y—Y'—Y"—O—Y of FIG. 2.

In FIGS. 1-3, a cup-shaped silencer box 1 has an annular opening 2 on one side thereof along the periphery, and opening 2 is covered with an annular side plate 11.

Said silencer box 1 is formed of cast iron or steel, and is formed with a central inner bore 3 of nominal diameter D for fluid flow therethrough, and with an annular inner cavity 4 communicating with the inner bore 3. A plurality of water stop bosses 5 (four bosses, in the illustrated example) for piping bolts are integrally formed with the silencer box around the inner bore 3 and are spaced equidistantly from each other along a circumference. A bolt insertion hole 6 is bored through each water stop boss 5. The water stop bosses 5 are formed with radical projections 7, with a slight clearance C1 being left between the outer surface of the projections 7 and the inner periphery of a cylindrical body 14, which will be explained hereinafter.

Figure 4:
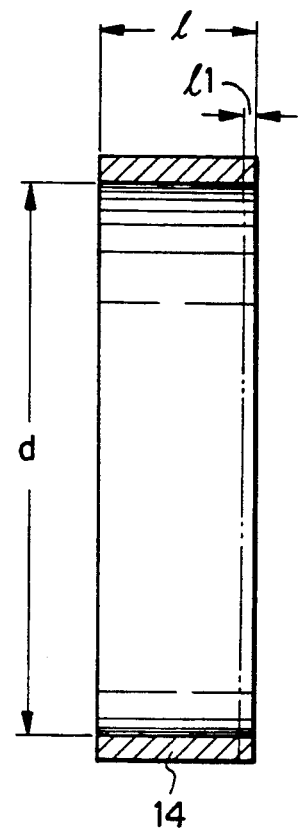
FIG. 4 is a sectional side view of a cylindrical body used in the embodiment shown in FIG. 1.

Inside the silencer box 1 and around the water stop bosses 5, there is provided the cylindrical body 14 which divides the inside space of the silencer box 1 into a radially inward fluid flow section A and an outer dry section B. Said cylindrical body 14 is formed of rubber which is an elastic material, to have a tubular shape, as shown in FIG. 4. Its inner diameter d is slightly larger than the outer diameter of a piping flange (not shown) to be connected and its axial length l includes a compression margin 11 allowing for a compression which is to occur when it is compressed by the side plate 11 upon mounting inside the silencer box 1. The compression margin 11 serves to seal the fluid section A and the dry section B.

A plurality (eight, in the illustrated example) of threaded bosses 8 for receiving bolts 13 for mounting the side plate 11 in the opening 2 via O-rings 12 are integrally formed with the silencer box 1 in the dry section B and are equidistantly spaced from each other along a circumference. The bosses 8 project from an inside wall 1a of the silencer box 1, and are connected to an inner circumferential wall 1b via wall portions 9. The bosses 8 have a threaded hole 10 bored therethrough. Between the outer surfaces of the threaded bosses 8 and the outer perimeter of the cylindrical body 14, there is provided a small clearance C2.

In accordance with such an arrangement, when the pressure of a fluid flowing through the fluid section A pulsates, the cylindrical body 14 will expand and contract due to the pulsation, diffusing and absorbing the pulsating energy. In this case, upon expansion, the outer perimeter of the cylindrical body 14 is restrained by the outer surfaces of the bosses 8 when it expands beyond the clearance C2. Therefore, the outer perimeter portions not opposite to the bosses 8 will be prevented from unlimitedly expanding, being deformed and broken.

On the other hand, upon contraction of the cylindrical body 14, the inner circumference of the cylindrical body is restrained by the outer surfaces of the radial projections 7 when it contracts beyond the clearance C1. Therefore, the circumferential portions not opposite to the projections 7 will be prevented from unlimitedly contracting, buckling and being broken.

Further, when pipes are connected to each other, the pipe silencer may be interposed between piping flanges and the piping bolts may be inserted into the insertion holes 6. Thus the connection can be made easily.

Since the invention is arranged in the above-described manner, only a device in which the outer diameter is slightly larger than that of the piping flanges is required and, therefore, only a device having correspondingly small weight is required.

In addition, facilitates the connection and installation of the piping.

Further, it is possible to extend the life-time of the rubber cylindrical body by improving the durability of it. The device is thus advantageous from the viewpoint of maintenance, also.

What is claimed is:

1. A pressure pulsation absorbing device adapted to be connected between a pair of piping flanges comprising: a cup-shaped silencer box having a central inner bore for fluid flow therethrough, and a plurality of water stop bosses integrally formed with said silencer box around said inner bore and circumferentially spaced from each other and through which piping bolts are to be connected to piping flanges; an elastic cylindrical body provided in said silencer box around said water stop bosses to thereby divided an inside space of said silencer box into a radially inward fluid flow section and a radially outward dry section; a side plate covering an opening of said silencer box in said dry section; a plurality of threaded bosses integrally formed with said silencer box in said dry section and circumferentially spaced from each other and receiving bolts for fixing said side plate to said silencer box; and a slight clearance being provided between outer surfaces of said water stop bosses and an inner circumference of said cylindrical body and another slight clearance being provided between outer surfaces of said threaded bosses and an outer periphery of said cylindrical body.

2. A pressure pulsation absorbing device as claimed in claim 1, wherein said silencer box includes an annular inner cavity communicating with said inner bore.

3. A pressure pulsation absorbing device as claimed in claim 1, wherein an inner diameter of said cylindrical body is selected to be slightly larger than an outer diameter of piping flanges to which the device is to be connected.

4. A pressure pulsation absorbing device as claimed in claim 1, wherein each of said water stop bosses is formed with a radial projection on the outer surface thereof, and said slight clearance is provided between an outer end of said radial projection and said inner circumference of said cylindrical body.

5. A pressure pulsation absorbing device as claimed in claim 1, wherein said silencer box is made of cast iron or steel.

6. A pressure pulsation absorbing device as claimed in claim 1, wherein said cylindrical body is a rubber tube having an axial length allowing for a compression margin for sealing upon attachment in said silencer box.

7. A pressure pulsation absorbing device as claimed in claim 1, wherein said silencer box includes an end wall and a circumferential wall, and said threaded bosses are integrally formed on inner walls of said end wall and said circumferential wall.

8. A pressure pulsation absorbing device as claimed in claim 1, wherein an outer diameter of the silencer box is selected to be slightly larger than that of piping flanges to which the device is to be connected.

9. A pressure pulsation absorbing device as claimed in claim 2, wherein an outer diameter of the silencer box is selected to be slightly larger than that of piping flanges to which the device is to be connected.

10. A pressure pulsation absorbing device as claimed in claim 3, wherein an outer diameter of the silencer box is selected to be slightly larger than that of piping flanges to which the device is to be connected.

11. A pressure pulsation absorbing device as claimed in claim 4, wherein an outer diameter of the silencer box is selected to be slightly larger than that of piping flanges to which the device is to be connected.

12. A pressure pulsation absorbing device as claimed in claim 5, wherein an outer diameter of the silencer box is selected to be slightly larger than that of piping flanges to which the device is to be connected.

13. A pressure pulsation absorbing device as claimed in claim 6, wherein an outer diameter of the silencer box is selected to be slightly larger than that of piping flanges to which the device is to be connected.

14. A pressure pulsation absorbing device as claimed in claim 7, wherein an outer diameter of the silencer box is selected to be slightly larger than that of piping flanges to which the device is to be connected.

* * * * *